UNITED STATES PATENT OFFICE.

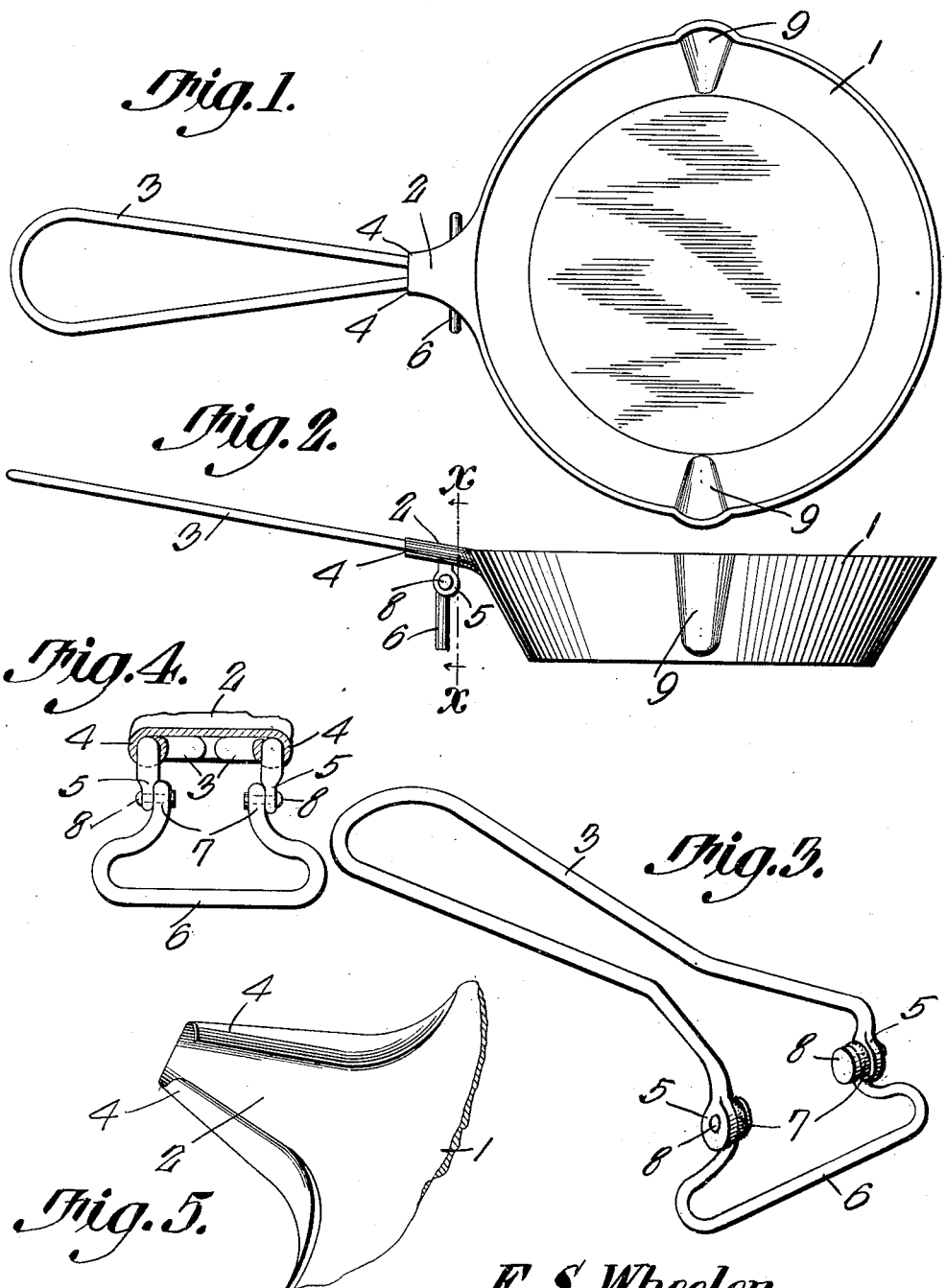

ENOCH S. WHEELER, OF CENTRALIA, WASHINGTON.

FRYING-PAN.

1,055,500.  Specification of Letters Patent.  Patented Mar. 11, 1913.

Application filed April 9, 1912.  Serial No. 689,550.

*To all whom it may concern:*

Be it known that I, ENOCH S. WHEELER, a citizen of the United States, residing at Centralia, in the county of Lewis and State of Washington, have invented a new and useful Frying-Pan, of which the following is a specification.

This invention relates to improvements in frying pans or culinary utensils, including the utensil or pan proper and its handle or attachments therefor.

The invention has for its object to provide increased facilities or convenience especially in pouring the contents of the utensil or pan. A further object is to provide for maintaining a "cold" handle, also for the maintenance of the same in a perfectly sanitary condition, or free from accumulations or lodgment of grease and dirt.

A still further object is to suitably retain the pan or utensil in position, especially when set into a lid-opening, as against casually tilting or tipping.

A still further object is to provide for readily accommodating the utensil or pan to, or supporting it in the lid-opening or with respect thereto regardless of its size.

A still further object is to carry out the aforesaid ends in a simple, expeditious and effective manner.

The invention therefore consists of certain instrumentalities and features substantially as hereinafter fully disclosed and specifically defined by the appended claims.

In the accompanying drawing illustrating the preferred embodiment of my invention wherein it will be understood that various changes and modifications may be made as to the detailed construction and arrangement of the parts thereof, Figure 1 is a plan of the utensil. Fig. 2 is a side elevation of the same. Fig. 3 is a perspective of the handle. Fig. 4 is a section taken upon the line *x—x* of Fig. 2, looking in the direction of the arrows. Fig. 5 is a fragmental perspective showing the handle receiving stub of the utensil.

In carrying out my invention, I provide a utensil 1, which is preferably formed of sheet steel, and is provided at the edge of its rim with a stub 2 preferably in one piece with the utensil, and adapted upon its under side to receive an auxiliary handle 3, the stub and the auxiliary handle conjointly constituting the utensil handle proper.

The stub 2 has its lateral edges rolled-under into tubular form as at 4, said tubular portions preferably tapering in diameter toward their outer ends.

The auxiliary handle 3, which may be in drawn tubular form, or of solid wire, is fashioned, as shown, into approximately elliptical or U-shape to define arms which are within the tubular edge portions 4 of the stub 2. The arms are held to the stub 2 by bending the latter therearound and filling in between the parts with solder, or by brazing the parts together. The inner ends of the arms of the auxiliary handle 3, are disposed in diverging relation and are extended downwardly and are terminated in eyes 5. A bail-like member or leg 6 is provided, the upper ends of which terminate in eyes 7, a pivotal connection between the eyes 5 and 7 being effected by pintles 8 which are inserted into the eyes. The pintles 8 are of such size as to fit frictionally tight in the eyes 5 and 7, to provide against the casual collapsing of the leg or bail member 6, and yet allow the angle of the leg to be forcibly changed, so that the leg will support the utensil 1 not only when the same rests upon the top of a stove, but, as well, when the utensil projects downwardly into the lid-hole. The utensil 1 may be provided with oppositely disposed spouts 9 for the convenience of a person who is left-handed, as well as one who is right-handed.

The handle herein disclosed will remain cool and may be kept clean without difficulty.

What is claimed is:—

1. In a device of the class described, a utensil provided with a projecting stub having along its edges, tubular elements which converge toward the free end of the stub; and a handle having diverging parts engaged within the tubular elements against withdrawal, the diverging parts of the handle terminating in depending extensions engaging the adjacent edges of the tubular elements; and a prop movably connected with the extensions.

2. A culinary utensil having a rim and including a stub-member at its rim edge, and a handle-forming member secured to the underside of said stub-member, said stub-member having rolled-under edge-tubular portions adapted to receive the lateral portions of said handle-forming member, said handle forming member being of wire-formation and having depending terminals, and a propping member of wire-formation having upstanding arms, said terminals and said upstanding arms having movable connection, said propping member being adapted to be angularly disposed with respect to said utensil.

3. A culinary utensil having a rim and including a stub-member at its rim-edge, said stub-member having rolled-under edge-portions, and a handle-forming member of wire-formation, with its lateral portions received and secured within said rolled-under edge-portions and depending terminals provided with eye-formations, and a propping member of bail-like form, having upstanding arms provided with eye-formations, coöperating with the aforesaid eye-formations, said eye-formations receiving pivots, said pivots and eye-formations having frictional engagement.

In testimony that I claim the foregoing as my own, I have hereto affixed my signature in the presence of two witnesses.

ENOCH S. WHEELER.

Witnesses:
L. MABEL LEE,
A. E. SEARS.

---

Copies of this patent may be obtained for five cents each, by addressing the "Commissioner of Patents, Washington, D. C."